May 14, 1963 A. LYKKEBERG 3,089,526
MACHINE FOR SLICING MEAT
Filed June 23, 1960 2 Sheets-Sheet 1

INVENTOR:-
ALFRED LYKKEBERG
BY
Edward B. Gregg
ATTORNEY

May 14, 1963  A. LYKKEBERG  3,089,526
MACHINE FOR SLICING MEAT
Filed June 23, 1960  2 Sheets-Sheet 2

INVENTOR:—
ALFRED LYKKEBERG
BY
Edward B. Gregg
ATTORNEY

United States Patent Office 3,089,526
Patented May 14, 1963

3,089,526
MACHINE FOR SLICING MEAT
Alfred Lykkeberg, 2507 22nd Ave., San Francisco, Calif.
Filed June 23, 1960, Ser. No. 38,345
5 Claims. (Cl. 146—153)

This invention relates to a machine for slicing meat.

This application is a continuation-in-part of my copending application Serial No. 770,479, filed October 29, 1958, entitled "Meat Slicing Machine," now U.S. Patent No. 3,028,894.

In the handling of meat which requires slicing, such as steak meat, the increasing cost of meat and the increasing cost of labor required to slice meat have given rise to a trend toward the preslicing of meat. Preslicing, that is to say, slicing meat before it is displayed and offered to retail customers, has the advantage that it can be carried out at a place and/or at a time which is convenient and with machinery instead of by hand.

A meat slicing machine should be capable of operation at high speeds; it should slice meat accurately so that each slice is smoothly cut and has a predetermined thickness; it should be readily adjustable for cuts of different thickness; and it should be simple to operate and easy to take apart, clean and reassemble.

In my copending application referred to hereinabove a machine of this character is described. The present invention represents an improvement upon the machine of my copending application, and it embodies such improved features as a means whereby large pieces of meat can be processed more quickly and whereby each piece of meat is sliced more accurately into slices of predetermined thickness.

One embodiment of my invention is illustrated by way of example in the accompanying drawings, in which.

Figure 1:
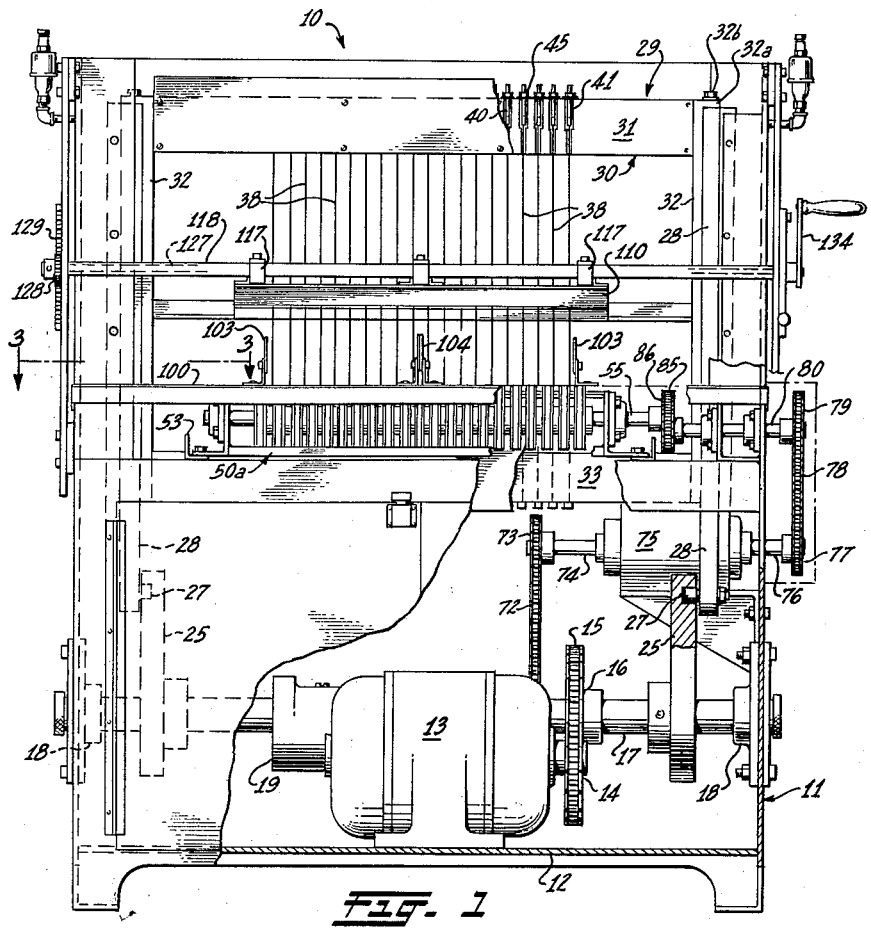
FIGURE 1 is a view in end elevation, as seen from the left of FIGURE 2 at the entry end of the machine. A portion of the housing is broken away to reveal parts of the machine which are normally concealed and a portion of the operating mechanism is broken away also.
Figure 2:
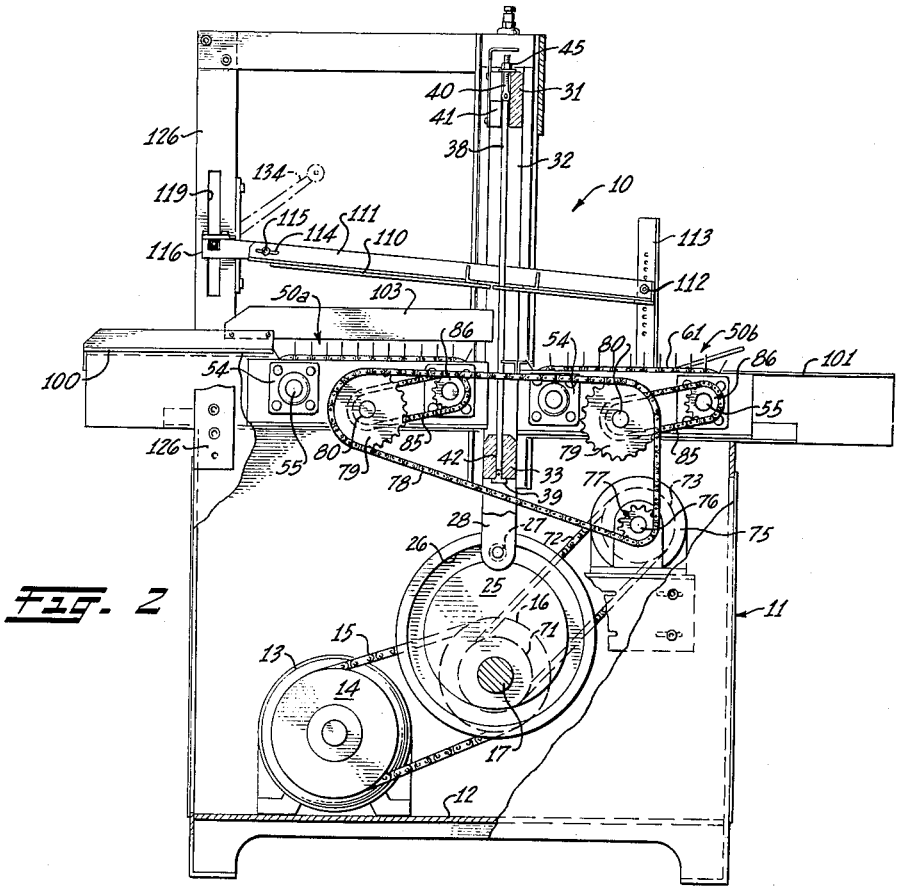
FIGURE 2 is a similar view but from the side, as seen from the right of FIGURE 1. A portion of the housing is broken away and some of the interior parts are also broken away to reveal more clearly certain features of interior construction.

Referring now to the drawings and more particularly to FIGURES 1 and 2, the machine is generally designated by the reference numeral 10. It comprises a framework and housing 11 which includes a base 12. A motor 13 is mounted on the base 12 and it drives a sprocket 14. A chain 15 is driven by the sprocket 14 and the chain 15 drives a sprocket 16 fixed to a shaft 17 journaled in bearings 18 which are carried by the side walls of the housing 11. A counterweight 19 is fixed to the shaft 17 to counterbalance two eccentrics 25 which are also fixed to the shaft 17. Each of the eccentrics 25 has a groove 26 which acts as a track for a roller 27 which is rotatably mounted on the lower end of a vertical member 28.

The vertical members 28 are the vertical side portions of a cutting head 29 which comprises a removable inner frame 30. The inner frame 30 comprises a top horizontal member 31, a pair of vertical side members 32 and a bottom horizontal member 33. The inner frame 30 also has ears 32a at the top which are extensions of the side members 32 and which overlie and rest upon the tops of the vertical members 28 and which are bolted thereto as by means of bolts 32b. By removing or loosening the screws 32b it is possible to remove the inner frame 30 from its connection to the members 28, thus facilitating replacement of the inner frame 30 by another similar frame and permitting removal of the inner frame 30 for cleaning and adjustment as described hereinafter.

Figure 3:
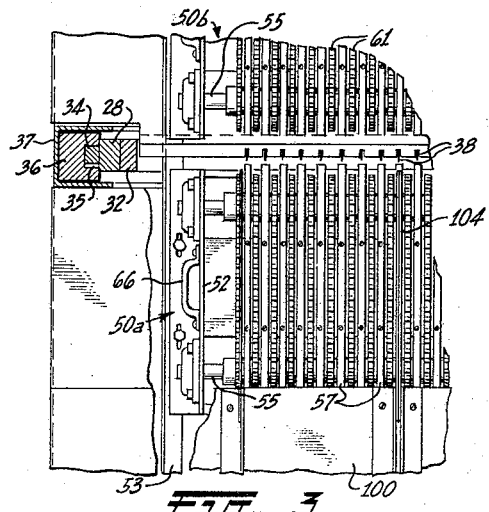
FIGURE 3 is a fragmentary view taken along the line 3—3 of FIGURE 1 showing portions of the entry or infeed and the exit assemblies and showing also certain features of the mounting of the cutting head.

Referring now more particularly to FIGURE 3, each vertical member 28 of cutting head 29 is fixed to a slide member 34 of wear resistant material which slides in a groove 35 formed in a vertical stationary frame member 36. Each frame member 36 is seated in and enclosed by a vertical channel 37.

Referring now to FIGURES 1 and 2, slicing blades are provided at 38 which are mounted vertically in the inner frame 30. The blades 38 are preferably smooth blades (i.e., not sawtooth) when the meat to be sliced does not contain a bone or bones. In cases where the meat to be sliced contains a bone or bones it is preferable to employ sawtooth blades.

Referring more particularly to FIGURE 2 the top and bottom members 31 and 33 of the inner frame 30 are vertically slotted at 41 and 42, respectively, to receive the upper and lower ends, respectively, of the blades 38. At its lower end each blade 38 has an inverted T-member 39 pivotally connected thereto and at its upper end it has a link 40 whose upper end is threaded to receive a nut 45 and a washer. As best shown in FIGURE 1 each of the upper slots 41 is formed with a wide upper portion to receive the respective link 40 and with a narrow bottom portion. By tightening the respective nut 45 each blade 38 is firmly and tightly clamped in place. By loosening the respective nut 45 each blade is loosened and can be pulled to the left, as shown in FIGURE 2, to dislodge it from the upper slot 41. The blade can then be removed completely by removing the nut and washer and dropping the blade through its bottom slot 42.

By this means it is possible to remove and install the inner slide frame 30; to clean this frame and its blades 38; to replace a frame 30 with another frame; and to remove and add blades to adjust the thickness of slicing.

Figure 4:
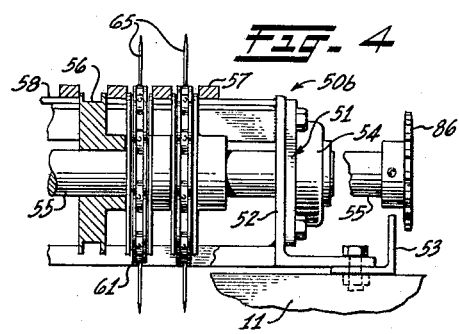
FIGURE 4 is an enlarged fragmentary view, partly in elevation and partly in vertical section taken through one of the feed assemblies, showing certain details of construction thereof.
Figures 5, 6, 7:
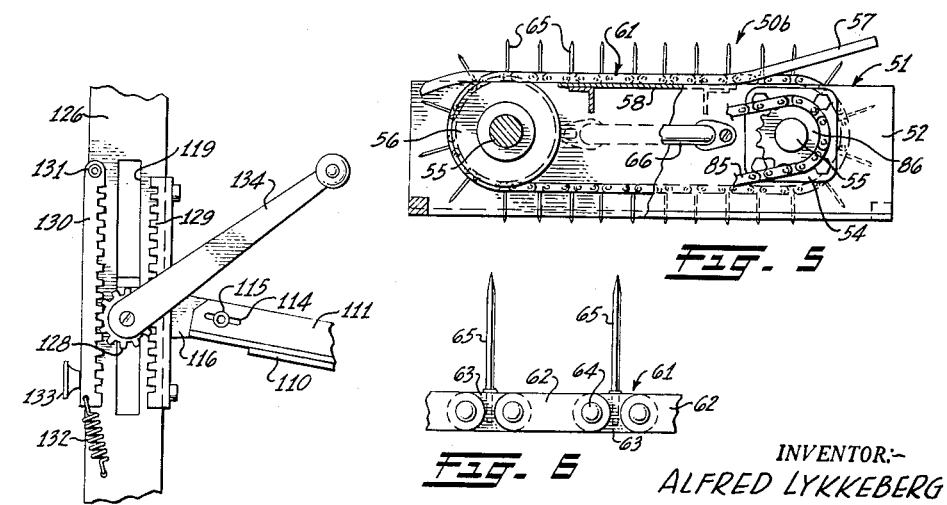
FIGURE 5 is an enlarged view generally in side elevation of one of the feed assemblies but with certain parts broken away to reveal interior construction.
FIGURE 6 is an enlarged fragmentary view in side elevation of one of the spike chains employed in connection with the feed assemblies.
FIGURE 7 is an enlarged fragmentary view in side elevation showing the means whereby the hold-down plate is adjusted.

Referring now principally to FIGURES 2, 4 and 5, on the entry side of the machine, that is to say, on the left-hand side as viewed in FIGURE 2, there is provided a detachable infeed assembly 50a for feeding bulk meat to the blades 38 and at the exit side (the right-hand side as viewed in FIGURE 2) there is provided another similar, detachable exit assembly 50b for removing the sliced meat. The two assemblies 50a and 50b are very similar to one another except for certain features noted hereinafter. It will be noted that the exit assembly 50b is located at a lower level than the entry or infeed assembly 50a.

The exit assembly 50b is shown in detail in FIGURES 4 and 5. It comprises a frame 51 having side angles 52 which are bolted to angles 53 which in turn are fixed to the framework of the machine. As shown in FIGURE 3 the angles 52 are slotted to permit adjustment of the assemblies 50a and 50b for a purpose described hereinafter. Bolted to the angles 52 are bearings 54. The connection of the bearings 54 to the angles 52 includes slotted means (not shown) whereby the bearings can be shifted toward or away from one another for a purpose explained hereinafter. There are two aligned pairs of bearings 54 for each assembly 50a and 50b. Each pair rotatably carries a shaft 55. Referring to FIGURE 4 it will be seen that pulleys 56 are mounted on one of the shafts 55. As will appear hereinafter one shaft of each assembly 50a and 50b is driven and it is preferred to mount sprockets (not shown) on these driven shafts. Between the pulleys 56 (and the sprockets) are bars 57 which extend lengthwise of the frame. A support plate 58 (see FIGURE 5) is mounted beneath the bars 57 and between the side angles 52.

Spike chains 61 are provided which are supported by and extend about the pulleys 56 and mesh with the sprockets. As shown in FIGURE 6, each spike chain 61 is formed of links 62 and 63 rotatably connected to one another at 64. Spikes 65 are fixed to the links 63.

As stated the assemblies 50a and 50b are closely similar. However, as shown in FIGURE 5, the bars 57 of the exit assembly 50b are tilted down at their inner ends (at the left as viewed in FIGURES 2 and 5) and they are tilted up at their exit ends (to the right as viewed in FIGURES 2 and 5). The bars 57 of the infeed assembly 50a are straight throughout their lengths. The purpose of the tilted ends of the bars of assembly 50b is explained hereinafter.

As shown in FIGURES 3 and 5 the assemblies 50a and 50b have handles 66 which are used to lift them. Each can be removed from the machine as a unit for cleaning, adjustment and repair and then reinstalled as a unit.

A drive is provided for the feed assemblies 50a and 50b as follows (see FIGURES 1 and 2): The shaft 17 carries a sprocket 71 (see FIGURE 2) which meshes with and drives a chain 72 which in turn meshes with and drives a sprocket 73 on a shaft 74 (see FIGURES 1 and 2). The shaft 74 drives a gear reducer 75 on whose output shaft 76 is a sprocket 77 which meshes with and drives a chain 78. The chain 78 meshes with and drives two sprockets 79 on shafts 80 which are journaled in the frame of the machine. On each shaft 80 is another sprocket (not shown) which meshes with and drives a chain 85 which drives a sprocket 86 on one of the shafts 55 of the respective feed assembly 50a or 50b. (It is these shafts 55 which also have sprockets for the spike chains 61.)

It will be apparent that, by this means, the spike chains 61 are driven in the same direction, that is to say, in clockwise direction as viewed in FIGURE 2, to feed bulk meat to the blades 38 (infeed assembly 50a) and to remove sliced meat (exit assembly 50b).

As noted above, the bearings 54 are mounted on the angles 52 by slotted means (not shown) so, that by loosening the bolts which clamp them to the angles 52 they can be shifted closer together to slacken the spike chains 61 and permit their removal or farther apart to tighten the spike chains 61.

Referring to FIGURES 1 and 2, aprons 100 and 101 are provided at the entry end and exit ends of the machine, respectively, and guide members in the form of angles are provided at 103 and 104. The central guide 104 serves as a double guide to cooperate with the two outside guides 103.

Referring to FIGURES 1, 2 and 7, a hold-down plate 110 is provided which has an important function in the operation of the machine. The plate 110 is supported by angle members 111 which are pivoted at 112 on vertical members 113. As will be seen the members 113 (only one of which is shown in FIGURE 2) are each provided with a vertical column of holes to permit adjustment of the pivot point. The hold-down plate 110 is made in two sections which are spaced part and one of which is slotted to clear the blades 38. At its forward end each of the angles 111 is slotted at 114 and is slidably connected at 115 to a link 116. Each link 116 is connected at 117 (see FIGURE 1) to a rectangular tube 118 which is slidably but nonrotatably located in slots 119 formed in vertical frame members 126 which are fixed to the frame of the machine. A shaft 127 is rotatable within the rectangular tube 118 and at each end it is fixed to a pinion 128 which meshes with a rack 129 fixed to the respective upright member 126. One of the pinions 128 also meshes with a second, movable rack 130 which is pivotally connected at 131 to the respective upright 126. A spring 132 is connected at one end to the movable rack 130 and at its other end the upright 126 and it functions to hold the rack 130 normally in meshing relation to the respective pinion 128 thereby normally locking the said pinion, and with it the hold-down plate 110 in fixed position. When it is desired to adjust the level of the hold-down plate 110 a handle 133 on the movable rack 130 is pulled outwardly, or to the left as viewed in FIGURE 7, to release the pinion 128 and a crank 134 is operated in one direction or the other to elevate or to lower the hold-down plate 110 as desired. When suitable adjustment has been made the handle 133 is released and the spring 132 acts to reengage the movable rack 130 with the respective pinion 128, thereby locking the hold-down plate 110 in adjusted position.

In operation the hold-down plate 110 is adjusted, at both ends if necessary, for the size of bulk meat which is being sliced so that it will rest lightly by its own weight on the meat and it is locked in such position by releasing the handle 133. The motor 13 is started. It operates spike chains 61 of feed assemblies 50a and 50b in clockwise direction as viewed in FIGURE 2. The motor causes reciprocation of the cutting head 29 and with it the slicing blades 38. Large pieces of meat are supplied to the inlet assembly 50a. It will be noted that the machine is a double machine and that pieces of meat can be supplied simultaneously between each pair of guides formed by the guide members 103 and 104.

The spikes 65 of the spike chains 61 penetrate each piece of meat and it is supplied to the infeed assembly 50a which feeds it positively and forcibly to the blades 38. The hold-down plate 110 holds down each piece of meat. The positive feed provided by the spikes 65 of the infeed asembly 50b, the hold-down effect of the plate 110 and the reciprocating motion of the blades 38 combine to provide a dependable feed and a uniform and very rapid slicing. The spike chains 61 of the exit feed assembly 50b cooperate by gripping the slices of meat as they emerge from the head 29 and pull them through. The fact that the exit assembly 50b is slightly lower and that the rearward ends of its bars 57 are tilted downwardly facilitate transfer of the meat slices to the exit assembly 50b. The slices of meat progress to the right as viewed in FIGURE 2. The upwardly tilted forward ends of the bars 57 aid materially in stripping the slices of meat from the spikes 65.

Several important advantages of the invention will be apparent. The machine is capable of operation at high speed. Even when operating at very high speed it produces a very uniform slicing of meat. Each piece is sliced uniformly and smoothly. If meat containing bone is being sliced it may be desirable to operate the machine at a lower speed than when boneless meat is being sliced. Parts which need frequent cleaning, such as the feed assemblies 50a and 50b and the inner frame 30 with its slicing blades 38, can be removed very easily for cleaning, for replacement of worn or broken parts and for adjustment. Individual blades 38 can be easily removed and inserted. This facilitates adjustment for slices of different thickness. As noted above the spacing of the two feed assemblies 50a and 50b can be adjusted by reason of the slotted mounting shown in FIGURE 3. Therefore, proper spacing for any condition of operation can be readily brought about. Also each assembly 50a and 50b can be removed as a unit for servicing and reinstalled. The slotted mounting of these assemblies permits adjustment of their spacing for optimum operation. The hold-down plate 110 can be easily and quickly adjusted for larger or smaller pieces of meat.

Another feature of the machine, is the fact that it can be used for cutting meat into small irregular chunks instead of slicing it into uniform slices. For example, if it is desired to cut up stew meat into small chunks, such can be readily accomplished by slicing the bulk meat with hold-down plate 110 detached at 112 so that it rests by its own weight on the mulk meat. It is an interesting fact that, when operated in this manner, the meat will be cut into rather irregular slices. These slices are then passed through the cutting blades once more at right angles to the face of the slide with the hold down plate resting thereon by its own weight. After traversing the cutting blades a second time the meat will emerge as small chunks suitable for stew purposes and the like.

It will, therefore, be apparent that a machine has been provided which is capable of high speed cutting, including in particular high speed uniform slicing of meat. The machine is easy to operate, to adjust, to take apart, and to reassemble, clean and repair.

I claim:

1. A machine of the character described comprising a stationary framework, a cutting head including an upright frame member reciprocable in said framework and having a plurality of upright cutting blades mounted therein in spaced parallel relation to slice meat as it is supplied to the head; a first endless feed member provided with spikes to penetrate pieces of meat and to move the same toward said head; a second endless feed member provided with spikes to penetrate sliced meat as it comes from said head and to move the sliced meat away from said head; and a hold-down plate having at least a portion coextensive with said first endless feed member and at least a portion coextensive with said second endless feed member for applying pressure to the top surface of each piece of meat to impale it on said spikes as it is fed by said first feed member to said head and as it is removed in sliced form by said second feed member from said head.

2. An automatic meat slicing machine for slicing bulk meat into slices of uniform thickness, said slicing machine comprising a stationary framework; a slide frame vertically slidable in said framework; a demountable frame dimensioned for accommodation within said slide frame; a plurality of slicing knives carried by said demountable frame in parallel forming a uniformly spaced array; an intake conveyor and a separate exit conveyor; said intake conveyor being in the form of an endless member having one end closely adjacent said slide frame on one side thereof and having spikes for penetrating bulk meat and for feeding bulk meat toward said slide frame, said exit conveyor being also in the form of an endless member, being in a plane slightly below the plane of said intake conveyor and having one end closely adjacent said slide frame on the opposite side thereof for and having spikes for penetrating slices of meat as they come through said slide frame and to carry these slices of meat away from said frame; means for simultaneously reciprocating said slide frame, operating said intake conveyor to feed bulk meat to said slide frame and operating said exit conveyor to carry sliced meat away from said slide frame; and a hold down member partially overlying said intake conveyor and said exit conveyor for urging said meat firmly upon said spikes.

3. An automatic meat slicing machine for slicing bulk meat into slices of uniform thickness, said slicing machine comprising: a stationary framework; a slide frame vertically slidable in said framework; a plurality of slicing knives carried by said frame forming therewith a uniformly spaced slicing knife array; an intake conveyor and a separate exit conveyor; said intake conveyor being in the form of an endless member having one end closely adjacent said slide frame on one side thereof and having spikes for penetrating bulk meat for feeding bulk meat toward said slide frame, said exit conveyor being also in the form of an endless member, being in a plane slightly lower than the plane of said intake conveyor and having one end closely adjacent said slide frame on the opposite side thereof for and having spikes for penetrating slices of meat as they come through said slide frame and to carry these slices of meat away from said frame; means for simultaneously reciprocating said slide frame, operating said intake conveyor to feed bulk meat to said slide frame and operating said exit conveyor to carry sliced meat away from said slide frame; and a plate-like hold down member overlying a portion of said intake conveyor and said exit conveyor, said hold down member being pivotably connected to said framework about an axis parallel to and above said exit conveyor, the other side of said hold down member being adjustably positioned to firmly contact said bulk meat.

4. An automatic meat slicing machine for slicing bulk meat into slices of uniform thickness, said slicing machine comprising: a stationary framework; a slide frame vertically slidable in said framework; a purality of slicing knives carried by said frame forming therewith a uniformly spaced slicing knife array; an intake conveyor and a separate exit conveyor; said intake conveyor being in the form of an endless member having one end closely adjacent said slide frame on one side thereof and having spikes for penetrating bulk meat for feeding bulk meat toward said slide frame, said exit conveyor being also in the form of an endless member and having one end closely adjacent said slide frame on the opposite side thereof for and having spikes for penetrating slices of meat as they come through said slide frame and to carry these slices of meat away from said frame; means for simultaneously reciprocating said slide frame, operating said intake conveyor to feed bulk meat to said slide frame and operating said exit conveyor to carry sliced meat away from said slide frame; and a hold-down plate extending across said array and overlying a substantial portion of said intake and said exit conveyor, one end of said plate being pivotably connected above said exit conveyor to said framework and the other end being adjustably connected to said framework above said entry conveyor.

5. A machine of the character described comprising a stationary framework, a cutting head including an upright frame member reciprocable in said framework and having a plurality of upright cutting blades mounted therein in spaced parallel relation to slice meat as it is supplied to the head; a first endless feed member provided with spikes to penetrate pieces of meat and to move the same toward said head; a second endless feed member provided with spikes to penetrate sliced meat as it comes from said head and to move the sliced meat away from said head; and hold down means overlying said first and second endless members for applying pressure to the top surface of each piece of meat to impale it on said spikes as it is fed by said first feed member to said head and as it is removed in sliced form by said second feed member from said head.

References Cited in the file of this patent
UNITED STATES PATENTS

| | | |
|---|---|---|
| 1,266,450 | Garlock et al. | May 14, 1918 |
| 2,126,057 | Szwargulski | Aug. 9, 1938 |
| 2,147,322 | Tuthill et al. | Feb. 14, 1939 |
| 2,437,122 | Petskeyes | Mar. 2, 1948 |